United States Patent [19]

Rochat

[11] 4,274,719
[45] Jun. 23, 1981

[54] SLIDE PROJECTOR

[76] Inventor: Charles-Louis Rochat, Chemin des Tournettes, Veyrier, Geneva, Switzerland

[21] Appl. No.: 72,607

[22] Filed: Sep. 5, 1979

[30] Foreign Application Priority Data

Sep. 16, 1978 [CH] Switzerland .......................... 9666/78

[51] Int. Cl.³ ...................... G03B 23/02; G03B 21/14
[52] U.S. Cl. ..................................... 353/103; 353/86; 353/90; 353/104; 353/112; 353/DIG. 1
[58] Field of Search ....................... 353/83, 86, 90, 93, 353/82, 112, 104, 111, DIG. 1, 103

[56] References Cited

U.S. PATENT DOCUMENTS

| 3,093,030 | 6/1963 | Carrillo | 353/86 |
| 3,264,937 | 8/1966 | Antos | 353/83 |
| 3,501,231 | 3/1970 | Fisher | 353/82 |
| 3,501,232 | 3/1970 | Jackson | 353/86 |
| 3,782,816 | 1/1974 | Costanza | 353/112 |

Primary Examiner—Steven L. Stephan
Attorney, Agent, or Firm—Emory L. Groff, Jr.

[57] ABSTRACT

A series of slides are placed in a vertical loader and are movable alternatively into respective ones of two projection positions. Each slide is moved laterally of the loader by a carriage, then pushed to the projection position by a push rod. During projection the following slide in the loader is similarly moved to the other projection position. After its projection, the first slide is brought back by a further push rod to its carriage and then is moved by the carriage to be deposited in a receptacle and be replaced by a new slide which will be moved into the same projection position.

4 Claims, 4 Drawing Figures

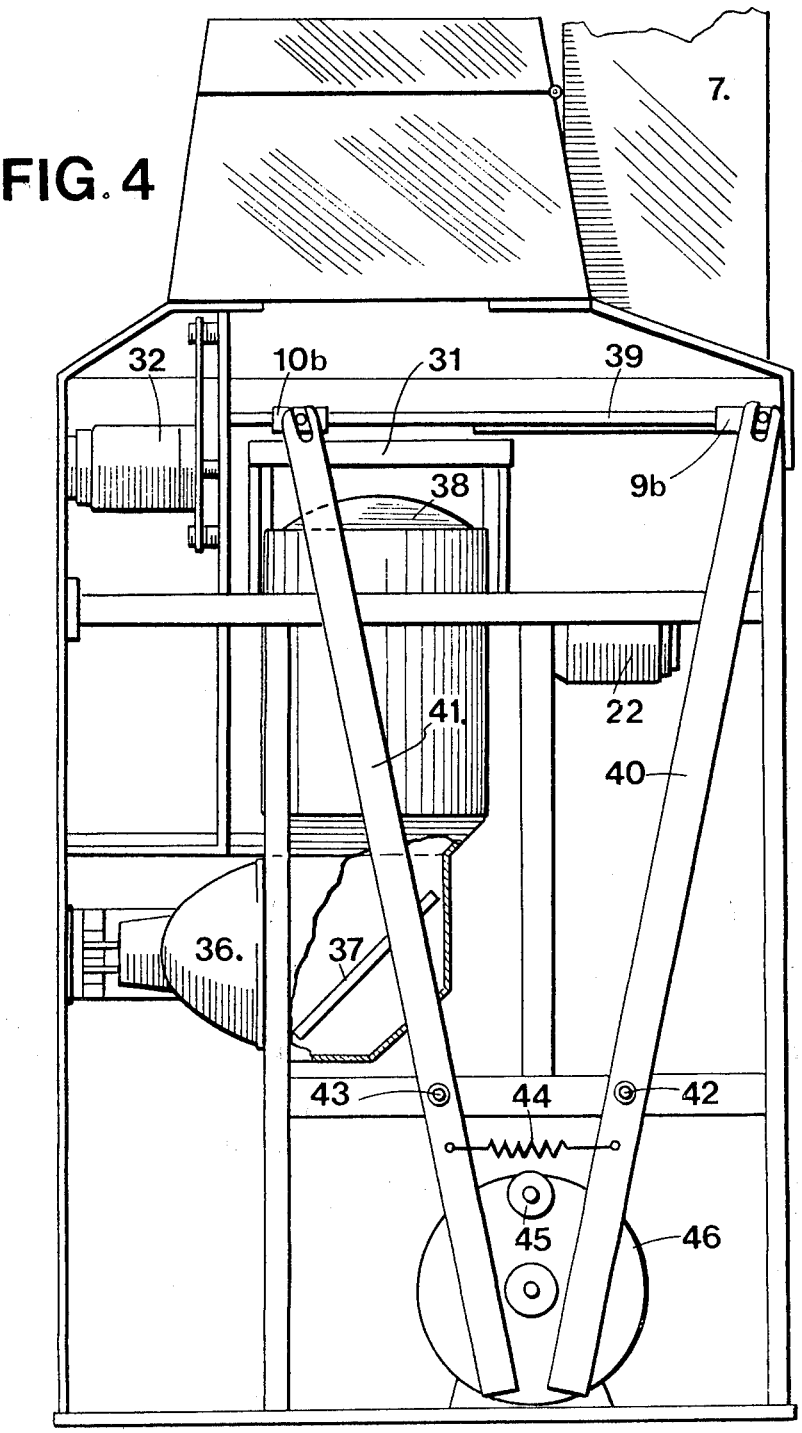

SLIDE PROJECTOR

The invention relates to a slide projector.

The purpose of the invention is to provide a projector making it possible to change from projecting one slide to projecting the following slide by a cross fade without it being necessary to start again in two groups before projection of the slides to be projected.

The attached drawing shows, in the form of a diagram, and purely as an example, an embodiment of the projector concerned by this invention.

FIG. 4 is a view showing on a larger scale the slide shown in FIG. 1, the front face of its casing having been removed.

Figure 1:
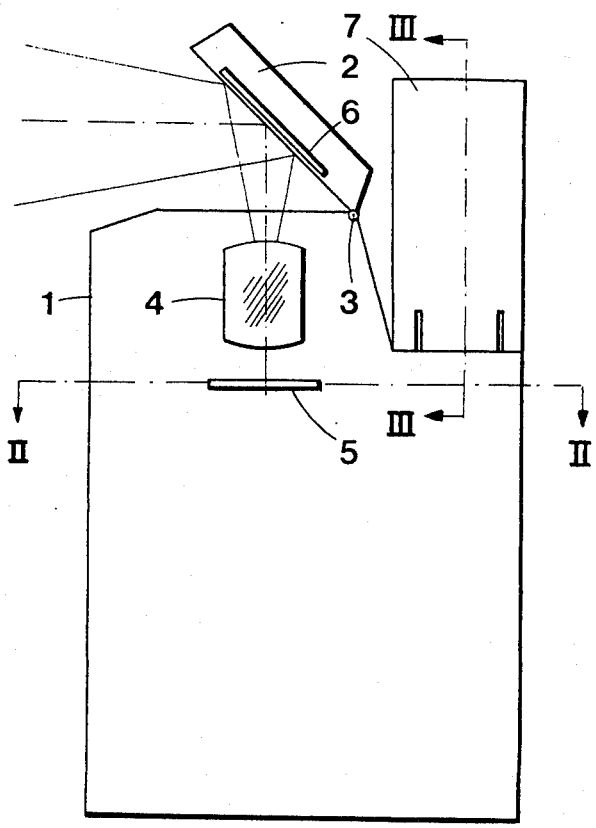
FIG. 1 is an explanatory view showing the slide in elevation.

With reference to FIG. 1, the slide projector has a box or casing 1 on which is mounted a cover 2 hinged at 3. This box contains two vertical centre line lenses 4 arranged side by side, that is to say one behind the other with reference to FIG. 1.

The bottom part of the projector has two sources of light and means for engaging them alternatively, so as to light one, then afterwards the other of slides 5 which are arranged underneath lenses 4. The rays of projection light are directed upwards and reflected by a mirror 6 accommodated in cover 2, in order to make it possible to effect projection against a vertical screen.

The slides to be projected are stacked in a vertical channel 7.

Figure 2:
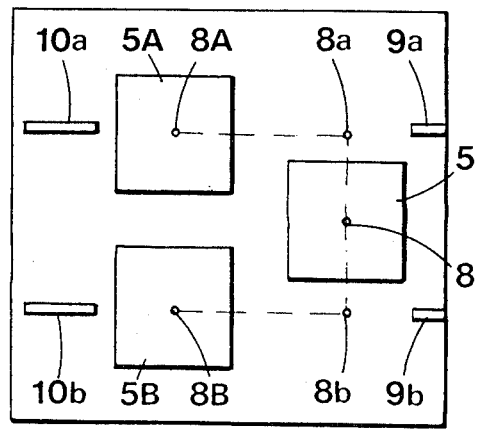
FIG. 2 is a section along II—II of FIG. 1.

FIG. 2 is a diagram illustrating the principle of movement of the slides in the projector. 8 designates the centre of a slide 5 located in channel 7. This slide 5 must be brought into the projection position 5A, whilst following slide 5 must be brought into position 5B.

For this purpose slide 5 is moved so that its centre comes into position 8a by means of a carriage which will be described further on. Then this slide is moved by a push rod 9a to bring its centre into position 8A.

Likewise the slide which has to be brought to location 5B is moved by the carriage until its centre is at 8b, then by means of push rod 9b, the centre is moved to 8B.

In this way it is possible to have at the same time one slide at 5A and another at 5B and to pass from projecting one to the other by gradually reducing the intensity of the light until it disappears, directed to location 5A, whilst the intensity of light is increased which is directed towards location 5B. During projection of the slide at 5B, it is possible to push again on the carriage, by means of a push rod 10a, the slide which was at 5A to then bring it into channel 7 and replace it with the following slides to be projected which is also in the channel.

In this way the slides stacked in channel 7 are alternatively brought to location 5A and to location 5B and are then sent in order into channel 7, which avoids any time-wasting preparation of the series of slides which the user wishes to project.

Figure 3:
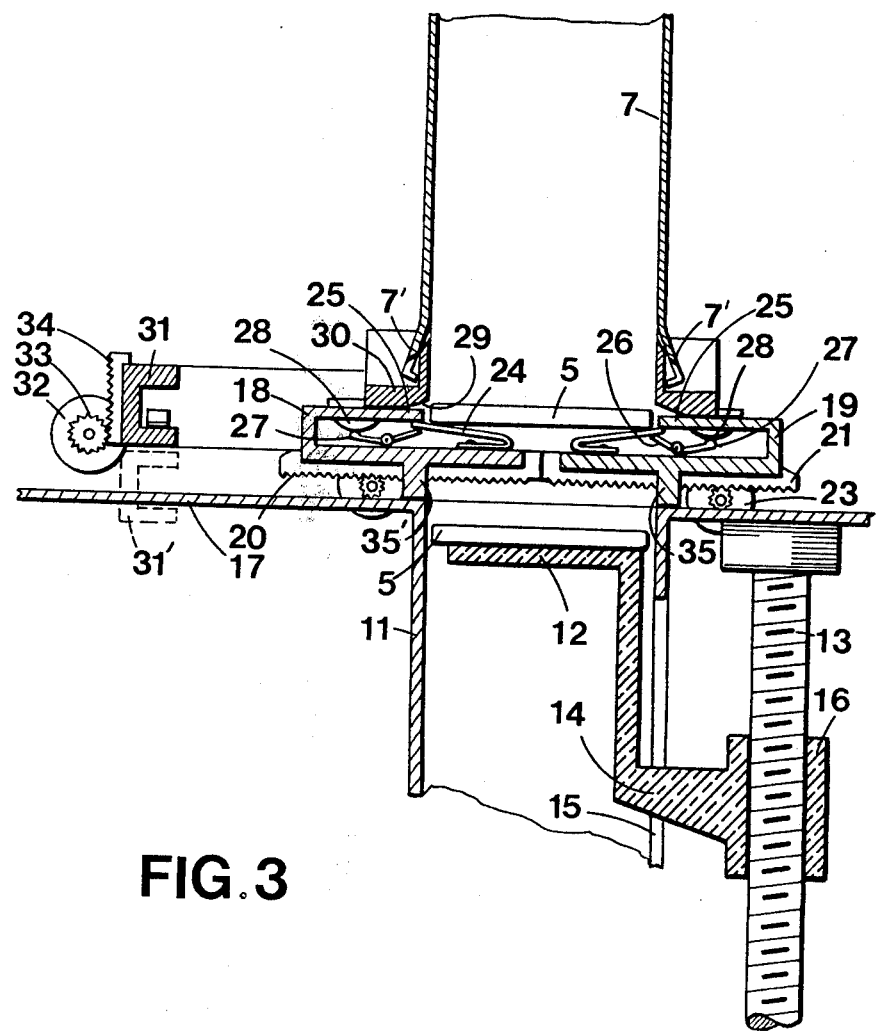
FIG. 3 is a partial section along III—III of FIG. 1.

FIG. 3 is a partial section showing the carriage intended to move the slides stacked in the top section of channel 7. As can be seen, this channel also has a bottom section 11 in which a lift plate 12 may be moved which is moved vertically by a threaded rod 13 driven in rotation by means not shown. For this purpose plate 12 is connected by an arm 14 passing into a vertical slot 15 made in the bottom section of channel 11, to a nut 16 cooperating with threaded rod 13.

Bottom section 11 of the channel is integral with a horizontal plate 17 on which a carriage may be moved formed of two sections 18 and 19. Each of these sections carries a rack 20 and 21, capable of being driven by a motor 22 or 23.

Each section 18, 19 of the carriage has a spring-loaded plate 24 supported flexibly against a wing 25 which is intended to be supported against the edge of slide 5 shown in FIG. 3 and which is the bottom slide of the stack, not shown, arranged in the top section of channel 7.

To avoid bending of spring-loaded plate 24 under the weight of the stack of slides, this plate is retained by a lever 26, a catch 27 of which cooperates with a cam 28.

In the case where the slide is of the plastic frame type with projecting glass, this frame is relatively thick and, at the time of the sideways movement of the carriage, the edge of this frame enters into contact with an inclined section 29 of a part 30 in which the base of channel 7 is attached. This inclined section 29 pushes the frame of the slide downwards bending spring-loaded plate 24, for at this time catch 27 of the locking lever is no longer in contact with locking cam 28.

If on the contrary, we are dealing with a simple cardboard slide, then this is very much thinner than the one shown in FIG. 3 and the cardboard slide may pass under part 30 without any need to deform spring-loaded plate 24.

When the two sections 18 and 19 of the carriage have been moved by a length which may be less than the length of one side of a slide, then the slide is brought opposite a projection support 31 in which it is pushed by a push rod which will be described further on. The projection support may be moved parallel to itself by a motor 32 carrying a pinion 33 engaged with a rack 34 of support 31. This motor 32 is used for automatic operation, but by means of a special control it is possible to bring support 31 into position 31' shown in FIG. 3. This position is achieved after projection of the slide, which makes it possible to push the latter back again under the carriage between two legs 35 and 35' on the carriage. When the carriage is brought into the centre position, it entrains the slide which then moves to lift 12 in section 11 of the channel.

The carriage consists of two sections 18 and 19 to make it possible, by a special control of motors 22 and 23, to separate these two sections from each other to make them come out of channel 7, 11 and leave the space inside free to allow complete withdrawal of the stack of slides at the projection. To facilitate this operation lift plate 12 may carry out a sufficient stroke upwards so that the bottom slide of the stack is located in channel 7, with reference to FIG. 3, above two flexible hooks 7'. This channel 7 can be removed and constitutes a magazine. When this magazine is withdrawn upwards, the two hooks 7' approach each other and engage under the bottom slide in the stack.

FIG. 4 shows in greater detail various special design features of the projector. One of the two projection lamps 36 is visible and has a fitted reflector. Its luminous flex is reflected by a dichroic mirror 37 towards a condensor 38 located just below projection support 31.

Push rods 9b and 10b of FIG. 2 are mounted so that they slide on a rod 39 and are actuated by two large levers 40 and 41 pivoted at 42 and 43. These two levers are brought back into the position shown by a spring 44 and are actuated by a handle 45 mounted on a disc 46 effecting a complete turn on each change of slide.

In this illustration we also find motor 32 which controls the operation by support 31 and motor 22 controlling section 18 of the carriage.

The projector also has the circuits for control of the operating motor and for control of the alternating lighting of the projection lamps. However these are well-known circuits which do not form part of the invention, so that they will not be described here.

Obviously a great many modifications and variations of the design parts of the projector may be made and in particular control circuits can be provided to make all the slides pass successively into a single projection location at will. Thus, if one of the lamps fails, it is possible to continue projection with the lamp which is still operating, but it is then no longer possible to benefit from the advantages of the cross fade at the time of changing a slide.

I claim:

1. A projector for slides comprising, means constituting a vertical channel for receiving slides, said means comprising an upper removable magazine portion and a lower portion for receiving slides after being shown, two juxtaposed slide supports adjacent said channel, two juxtaposed light projecting means arranged to project light through slides in said supports, carriage means in said channel for transporting a slide from the magazine to either of two positions each in line with one or the other of said slide supports, first pusher members for pushing a slide from either of said positions to the corresponding slide support, and second pusher members for pushing a slide from one or the other of said slide supports back to the corresponding position, said carriage means being formed of two parts adapted to be separated to allow passage of slides between them.

2. A projector in accordance with claim 1, comprising means to detachably secure said magazine in a vertical position above said carriage, and a lift plate movably positioned in said lower portion for raising slides to replace them in the magazine.

3. A projector according to claim 2, wherein said carriage means has at least one yieldable component for supporting the slides.

4. A projector for slides comprising, means constituting a vertical channel for receiving slides, said means comprising an upper removable magazine portion and a lower portion for receiving slides after being shown, a slide support adjacent said channel, carriage means in said channel for moving a slide transversely from the magazine to be positioned in said slide support, said carriage means having abutment means of a thickness to engage the edge of a slide for moving it, yieldable means on said carriage means for supporting a stack of slides in said magazine, holding means for preventing movement of said yielding means, means to release said holding means upon lateral movement of said carriage, said channel having guiding means for guiding a slide during its lateral movement on the carriage, said guiding means comprising a ramp portion which will cause slight downward movement of a slide of greater tha normal thickness against the yieldable means in its lateral movement.

* * * * *